UNITED STATES PATENT OFFICE.

WILLIAM SPEIRS SIMPSON, OF LONDON, ENGLAND, ASSIGNOR, BY MESNE ASSIGNMENTS, TO UNITED STATES CARBO-WELDING COMPANY OF DELAWARE.

METHOD OF UNITING OR WELDING METALS.

No. 927,292.  Specification of Letters Patent.  Patented July 6, 1909.

Application filed April 12, 1907. Serial No. 367,840.

*To all whom it may concern:*

Be it known that I, WILLIAM SPEIRS SIMPSON, a subject of the King of Great Britain, residing at 49 Battersea Park road, London, England, have invented certain new and useful Improvements in Methods of Uniting or Welding Metals, of which the following is a specification.

The present improvement is for the method or process of uniting or welding metals, particularly unlike metals such as soft and hard metals, that is metals of different kinds or characteristics, or which fuse at different temperatures, and especially iron or steel and copper, without the use of a flux as ordinarily understood and without pressure, the object of the invention being to provide a method or process which will, as has been thoroughly demonstrated, fusion-weld or unite various metals, such as steel or iron and copper effectively and in such a manner that there is such an interpenetration of the welded metals that they cannot be separated one from the other.

In carrying out the present process I am able to produce compound metal bodies consisting of layers or strata of unlike metals united as permanently, for example, as welded layers of iron or steel, and since this perfect union of iron and steel is usually designated as and generally understood to be a weld, and because this term "weld" is the one which by those skilled in the art is most naturally applied to such a union, I have also designated herein the union which I obtain between the unlike metals by the term "weld", although it is to be understood that I do not thereby limit or confine myself to any particular theory as to the actual nature of the union between such unlike metals, although I apprehend that, since tests have demonstrated the impossibility of wedging the copper from the steel, the steel itself separating rather than the copper therefrom, there is a molecular interpenetration of the metals and what may be considered a perfect or true weld between such unlike metals.

This invention has for its object (A) the firmly uniting, joining, or welding of metals which fuse or melt at high temperature, such as iron and steel (hereinafter designated as the "harder metals") to and with other metals which fuse or melt at lower temperatures, such as aluminium, copper, tin, lead, zinc, and their various alloys (hereinafter designated as the "softer metals" or in some cases as the "welding material") and (B) by means of such method or process of the uniting, joining or welding together of metals of varying characteristics and qualities, either to cheapen or improve (or both) many articles of utility in the industrial arts wherein (1) it may be desirable to protect the harder metal from corrosion or deterioration, by covering it on one or both sides, or, if tubular, externally and internally, with softer metal, of any desirable thickness, or (2) to strengthen articles hitherto manufactured from the softer metal by the union thereto of the harder metal on one or both sides, and externally or internally, or (3) by using the softer metal as a welding material or means of union, to connect and firmly join, unite, or weld together a pair or series of plates, sheets, bars, rods, tubes, or other shapes composed of the harder metal, so that a strong, homogeneous, composite whole may be constructed for such uses as require a rigid, hard, or friction-resisting face or exterior, in combination with a core or back of softer or more malleable or elastic metal, or a metal of greater toughness or tensile strength than the exterior.

In carrying out the purpose of my invention, I bring into contact the surfaces of the requisite pieces of harder and softer metal, which are to be united, joined or welded together; for instance, a sheet or plate of steel is brought into contact with a corresponding sheet or plate of aluminium, copper, brass or other metal of any required thickness, with which it is intended to cover the former (upon one or both sides) and the same are clamped together in the desired position, or in some cases two or more plates of steel having a sheet or plate of copper, aluminium, brass or other metal interposed between each two of the same, are assembled in the desired relative positions and firmly clamped or otherwise held together, then the articles so clamped together are incased, covered or enveloped on all sides (inside and out if hollow or tubular) with a paste composed of ground coke, charcoal or other form of carbon, as pure as reasonably possible, mixed with water and a binding material such as treacle, sugar, starch, flour, or other similar substance, preferably such as may be soluble in water and having the properties of binding with water and, when calcined, of forming a reasonably pure coherent coke. This carbonaceous covering or envelop may either be formed into a mold, to fit the mass of metal assembled for welding, which after being suitably dried may be used to envelop the matter while being heated, or the metals to be welded may be placed in a suitable receptacle such as a fire-resisting crucible or a metallic vessel, with or without a cover, and the carbonaceous paste may be tightly packed around the same on all sides; after which the entire mass of metals, carbonaceous covering or packing and receptacle are subjected to sufficient heat, either (a) in a muffle or other furnace, or (b) in a bath of molten metal, such as pig-iron, to fuse or melt the softer but not the harder metal. Under the said conditions and when subjected to temperatures sufficient to melt the softer metal, the carbonaceous casing or envelop prepared as aforesaid, provides a reducing agent or atmosphere which effectively deoxidizes the surface of the harder metal (which requires no other preparatory pickling or cleaning) and also prevents the oxidation of the softer metal while molten, so that in a brief space of time after fusing, the latter becomes firmly joined, united, or welded to and with the harder metal at every point of contact; in some cases there being an appreciable infiltration of a portion of the softer metal into the harder metal in contact therewith. The carbonaceous paste prepared as aforesaid also forms an efficient mold to retain in the desired position and prevent the escape of the softer metal while molten.

In some cases especially if the softer metal being employed is copper, it is desirable to add to the carbonaceous paste a small quantity of zinc or zinc filings, the presence of which is advantageous for the prevention of blow holes in the copper surfaces while cooling.

In some cases two or more steel plates or like articles which are to be joined or united by an interposed sheet of welding material, such as copper or brass, may be spaced or kept at the desired distance from each other, by inserting between the same, suitable spacing disks or rivets of steel to prevent the softer metal or welding material from being squeezed out or displaced while molten, by the weight or pressure of the plates to be joined, united or welded.

In some cases when it is required to join, unite or weld together two or more plates, bars, rods or other articles of iron or steel into a composite whole, the same may be assembled or arranged and suitably spaced and clamped or otherwise held in their desired relative positions and a quantity of the softer metal or welding material sufficient to accomplish the desired union or welding may be placed, either in solid or granular form, on the top of the assembled articles of harder metal and the entire mass may then be covered or enveloped in the carbonaceous paste as hereinbefore described and subjected to heat in such a manner that the softer metal when fused or melted, will flow downward and fill the interstices of the mass of harder metals underneath and so accomplish the desired union or welding together of the integral parts thereof, or in some cases, articles of the harder metal such as iron or steel may be assembled and clamped together in the desired relative position, and the mass covered with or enveloped in the hereinbefore described carbonaceous paste and, while being subjected to the necessary heat, the copper, brass or other softer metal with which it is desired to weld together the articles of harder metal may be introduced in a molten condition and brought into contact therewith (in any convenient manner) so as to flow downward and fill up the interstices or pre-arranged spaces intended to receive the same in the assembled articles of harder metal. A simple method of such introduction is, when enveloping or covering the mass of harder metal with the carbonaceous paste, to so place a plumbago crucible, having a cover, on the top of the mass of assembled metals that, from a small hole or orifice in the bottom of such crucible (which must be stoppered until the moment when the soft metal or welding material is to be released therefrom), the molten welding material, when poured therein, may flow into the interstices of the mass of assembled metals below, and join, unite or weld the same firmly together, or in some cases may form a coating of the softer metal upon the harder metal in a suitably prepared mold formed by the carbonaceous paste hereinbefore described.

In some cases, a paste or enveloping material may be employed that is lacking the requisite carbon, or is of a refractory character, such as graphite, in which event the metals to be welded or united may be placed in a crucible or other suitable receptacle having a cover which may be luted or otherwise fastened thereon, and the enveloping material may be placed around such metals therein and the receptacle hermetically sealed, and while being subjected to heat, carbonic oxid may be introduced into the crucible or receptacle, under pressure, by means of a tube passing through the cover thereof and through the enveloping material, so that the gas may be brought into contact with the metals under the conditions required to provide a reducing or de-oxidizing atmosphere suitable for the accomplishment of the desired result. In like manner, articles of the harder metal may be enveloped or covered with a paste the chief ingredient whereof may be graphite or other material so refractory or so low in carbon as to require the additional presence of carbonic oxid introduced as above mentioned, and the copper, brass, or other softer metal or welding material may be introduced in molten form and brought into contact with the harder metals in the manner and for the purposes hereinbefore described.

This invention has a wide range of utility. Among its uses may be mentioned (1) the coating of ships' plates and of propeller and turbine blades with copper or brass, (2) the covering of cylinders with copper for use in connection with calico and wall paper printing, and the covering of plates and cylinders for the stationers' and engravers' trade (3) the lining or coating of boiler and other tubes with copper and of steam condensers and locomotive fire-boxes (4) the construction of composite armor-plates wherein it may be desirable to associate extremely hard steel faces with soft or malleable steel backs or plates composed of a series of hard and soft or malleable steel plates in alternate layers, all firmly welded together by means of a quasi-elastic welding material, such as copper or bronze, (5) the construction of composite wheels, propeller shafts, locomotive and motor axles, axle boxes and other bearings, wherein it may be desirable to unite hard and friction-resisting exteriors with more elastic or less brittle interiors or centers, (6) the construction of heavy guns and lighter artillery by firmly uniting together by means of a copper or bronze welding material, various internal and external steel forgings, castings, wrappings, etc., of different qualities and characteristics as to rigidity, tensile strength, elasticity, etc., to produce a composite whole, which may be capable of withstanding great shock or strain, (7) the manufacture of copper incased steel or iron wire and composite cables, also for uses connected with electrical apparatus such as the reinforcement with steel of the wearing faces of switches and commutators, (8) the coating with brass, copper or other metals, of many articles made of iron or steel, used in the building trades, to prevent corrosion or to provide ornamentation.

From the foregoing it will be seen that I obtain weld-united layers of unlike metals, by subjecting such metals while in a heated condition, and with one eventually brought to a molten condition, to a material effective to cause, as I apprehend, the molecular interpenetration of one metal with the other; and notwithstanding I am aware that it has been claimed that unlike metals such as copper and steel have been actually and inseparably welded into a coherent, dense and impervious coating, nevertheless I believe that by my process it is possible, for the first time, to actually and inseparably weld unlike metals to obtain the molecular interpenetration of one with the other.

While the heat which is used may in some cases vary in temperature and be somewhat above the fusing temperature of the copper or softer metal, it is in no case equal to a supermolten temperature of such copper or softer metal, which supermolten temperature is 2500 degrees Fahrenheit or higher.

What I claim and desire to secure by Letters Patent is:—

1. The method of welding metals fusible at different temperatures, including iron or steel and copper, which consists in subjecting the metals to heat at least equal to the fusing temperature of the metal that is fusible at the lower temperature and simultaneously subjecting the same to a carbonaceous material.

2. The method of welding metals fusible at different temperatures, including iron or steel and copper, which consists in inclosing the metals to be welded in a plastic carbonaceous material and then subjecting them to heat sufficient to fuse or melt the metal that is fusible at the lower temperature.

3. The method of welding metals fusible at different temperatures, including iron or steel and copper, which consists in subjecting the metals while suitably inclosed to a carbonaceous reducing or deoxidizing agent and simultaneously subjecting the metals to at least heat up to the fusing temperature of one of the metals.

4. The method of welding metals fusible at different temperatures, including iron or steel and copper, which consists in enveloping the metals in a plastic material formed of a carbonaceous material, a binding material and water, and subjecting the metals to heat at least equal to the fusing temperature of the metal that is fusible at the lower temperature.

5. The method of welding metals fusible at different temperatures, including iron or steel and copper, which consists in subjecting the metals to a reducing agent effective to deoxidize the surface of the harder metal and prevent the oxidation of the softer metal, and simultaneously heating the metals up to the fusing temperature of the softer metal.

6. The method of welding metals fusible at different temperatures, including iron or steel and copper, which consists in inclosing the metals to be welded in a mold formed of a carbonaceous material, water, and a binding material, then subjecting the metals to heat sufficient to produce from such mold a reducing agent effective to produce the deoxidation of the harder metal and prevent the oxidation of the softer metal and to fuse one of the metals thereby to weld them together.

7. The method of welding metals, including steel or iron and copper, which consists in subjecting the metals while suitably confined to a heat lower than the supermolten temperature of the softer metal and a carbonaceous material, 8. The method of welding metals, including steel or iron and copper, which consists in subjecting the metals to be welded to the chemical action of a carbonaceous material and simultaneously heating such metals to a temperature sufficient to cause the steel or iron and copper to weld.

9. The method of welding metals, including steel or iron and copper, which consists in subjecting the metals to be welded to the chemical action of a carbonaceous material produced by inclosing the metals therein and heating up to a temperature at least equal to the fusing temperature of one of said metals.

10. The method of welding hard metals, including iron or steel, and soft metals, including copper, which consists in bringing into contact the several metals, enveloping the same on all sides with a covering of carbonaceous material, and subjecting the same to heat sufficient to fuse or melt the softer metal.

11. The method of welding metals fusible at different temperatures, including steel or iron and copper, which consists in bringing into contact the metals to be welded, enveloping the same on all sides with a covering of plastic carbonaceous material composed of ground coke or charcoal, water and a binding material, and then subjecting the same to a degree of heat sufficient to fuse or melt the metal that is fusible at the lower temperature.

12. The method of welding metals fusible at different temperatures, including steel or iron and copper, which consists in bringing into contact the metals to be welded, enveloping the same on all sides with a covering of a plastic material composed of a carbonaceous material, water and a binding material comprising treacle, sugar or starch, and then subjecting the same to a degree of heat sufficient to fuse or melt the metal that is fusible at the lower temperature.

13. The method of welding metals fusible at different temperatures, including steel or iron and copper, which consists in bringing into contact the metals to be welded, enveloping the same on all sides with a covering of a plastic material comprising a carbonaceous material composed of ground coke or charcoal, water and a soluble binding material comprising treacle, sugar or starch, and then subjecting the same to a degree of heat sufficient to fuse or melt the metal that is fusible at the lower temperature.

14. The method of welding the harder metals, including iron or steel, with the softer metals, including copper, aluminum, tin, lead, zinc, and their various alloys, which consists in covering the metals to be welded with a carbonaceous paste composed of carbon, water and a binding material effective to form a reducing or deoxidizing agent in contact with the metals under treatment while the same are subjected to heat sufficient to fuse the softer metals, whereby the weld is effected.

15. The method of welding the harder metals, including iron or steel, with the softer metals, including aluminum, copper, tin, lead, zinc, and their various alloys, which consists in enveloping the metals to be welded with a carbonaceous paste having incorporated therein zinc, and then subjecting the metals to be welded to heat sufficient to fuse the softer metal.

16. The method of uniting copper and steel or other soft and hard metals, which consists in subjecting the metals to heat and to a carbonaceous material whereby to obtain an interpenetration of one with the other.

17. The method of uniting unlike metals, including steel and copper, which consists in effecting the molecular interpenetration of one metal with the other, while one is in a molten condition at approximately the fusing temperature of such molten metal by subjecting such metals to the action of a carbonaceous material.

18. The method of uniting unlike metals which consists in subjecting such metals to a carbonaceous material and to heat lower than the supermolten temperature of either metal.

19. The method of uniting unlike metals which consists in subjecting such metals, while one is in a molten condition, to the action of a carbonaceous material.

20. The method of uniting unlike metals which consists in subjecting such metals, while confined in contact and while one is being brought to a molten condition, to the action of a carbonaceous material.

21. The herein described process of uniting harder and softer metals consisting in subjecting the metals while enveloped in a mixture of carbonaceous material and a soluble binding material, to heat to a degree equal to the melting point of the softer metal, substantially as described.

In testimony whereof I have hereunto set my hand in presence of two subscribing witnesses.

WILLIAM SPEIRS SIMPSON.

Witnesses:
RICHARD CORE GARDNER,
LYNWOOD FERDINAND GARDNER.